United States Patent [19]

Sartor

[11] Patent Number: 5,465,772

[45] Date of Patent: Nov. 14, 1995

[54] CONTROLLING AND MAINTAINING AIR-PRESSURE IN VEHICLE TIRES

[75] Inventor: Rolando D. Sartor, Curitiba, Brazil

[73] Assignee: Col-Ven S.A., Provincia de Santa Fe, Argentina

[21] Appl. No.: 47,240

[22] Filed: Apr. 14, 1993

Related U.S. Application Data

[63] Continuation-in-part of Ser. No. 380,620, Jul. 14, 1989, abandoned.

[30] Foreign Application Priority Data

Jul. 14, 1988 [BR] Brazil ..................................... 8803606

[51] Int. Cl.$^6$ ................................................. B60C 23/00
[52] U.S. Cl. ....................... 152/416; 137/487.5; 340/626
[58] Field of Search ..................................... 152/415, 416, 152/417; 137/557, 487.5; 340/626

[56] References Cited

U.S. PATENT DOCUMENTS

| | | | |
|---|---|---|---|
| 3,276,503 | 10/1966 | Kilmarx | 152/417 |
| 4,582,107 | 4/1986 | Scully | 152/417 |
| 4,599,902 | 7/1986 | Gray | 250/231.19 X |
| 4,782,879 | 11/1988 | Le Chatelier et al. | 152/417 |

FOREIGN PATENT DOCUMENTS

| | | |
|---|---|---|
| 0193452 | 9/1986 | European Pat. Off. . |
| 0263251 | 4/1988 | European Pat. Off. . |
| 2312772 | 12/1976 | France . |
| 2577060 | 8/1986 | France . |
| 2850787 | 6/1980 | Germany . |
| WO8908031 | 9/1989 | WIPO . |

*Primary Examiner*—Michael W. Ball
*Assistant Examiner*—Francis J. Lorin
*Attorney, Agent, or Firm*—Lowe, Price, LeBlanc & Becker

[57] ABSTRACT

Apparatus for controlling and maintaining air pressure in vehicle tires. The vehicle compressor outlet is connected through individual pneumatic tire circuits to each vehicle tire, via rotary couplings in the associated axles. Each tire circuit includes tubing for carrying air and monitoring tire pressure, the circuits supporting pressure sensors and electrovalves housed in a control unit in the dashboard of the vehicle. The control unit also houses electronic circuits interfaced with the sensors and electrovalves. The sensor includes a piston which causes a shutter to move in and out of the light path of a LED/phototransistor device. When it signals low tire pressure to the electronic circuit, the corresponding electrovalve is energized for the compressor to pump the tire up back to its set pressure. A front panel has LEDs and gauges for the driver to keep tabs on events.

6 Claims, 4 Drawing Sheets

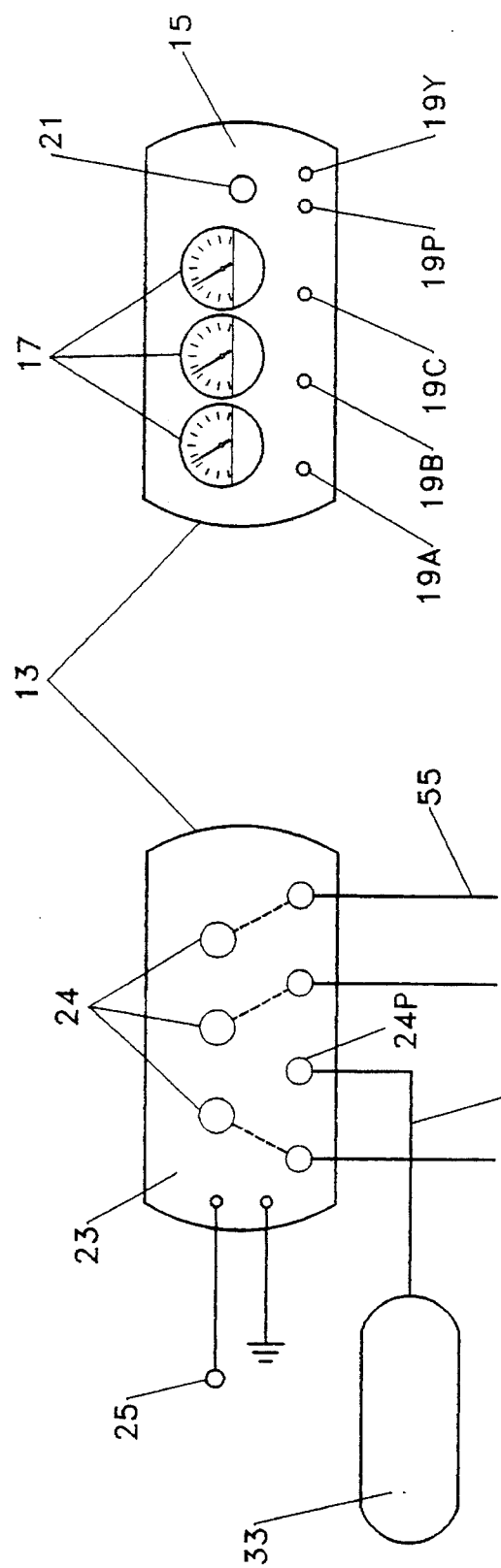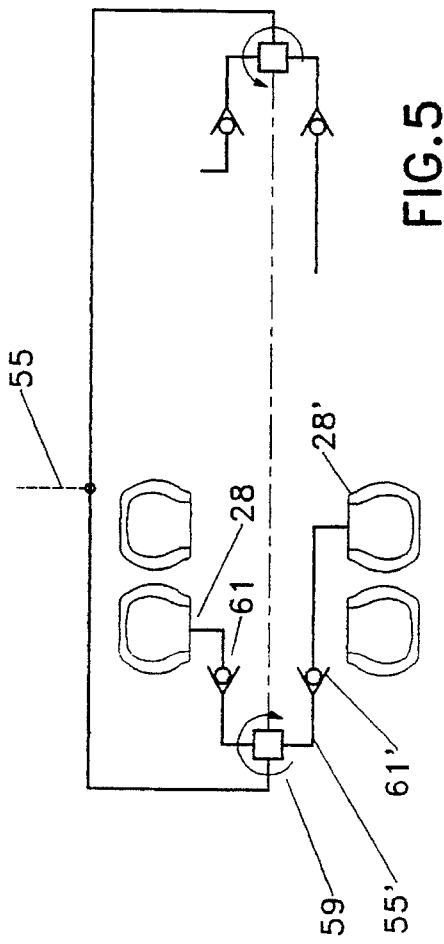

CONTROLLING AND MAINTAINING AIR-PRESSURE IN VEHICLE TIRES

This application is a continuation-in-part of my earlier application Ser. No. 380,620 filed Jul. 14, 1989, now abandoned.

FIELD OF THE INVENTION

The instant invention comprises an electronic and pneumatic apparatus for controlling and maintaining air pressure in vehicle tires. The apparatus includes a pneumatic circuit for distributing air from an internal pressure source, such as the compressor of a pneumatic braking system of the vehicle, and an electronic circuit interfacing the pneumatic circuit for sensing tire air-pressure and metering air from the air source to the different tires as needs be.

The invention also refers to a novel pressure sensor for use with the above apparatus

BACKGROUND OF THE INVENTION

A tire may wear unevenly and its life span shorten if left to roll at low pressure for substantial mileage. Moreover, when air-pressure in the different tires is uneven or inadequate in any way, vehicles are open to accident if braked suddenly at high speed or when transporting heavy loads. The development of new means of transport, both for goods and passengers, and improved road construction have brought lorries of ever increasing size and speeds as well as slicker and faster motorcars on the roads. It is thus essential for road safety that technologies regarding all the different vehicle parts keep pace by providing means preventing minimum fault which could lead to catastrophic results.

Equipment is already known for regulating air-pressure in tires in both light and heavy vehicles. It generally comes with a control panel mounted to the vehicle dashboard for the driver to keep a check on tire pressure status. The object of this sort of equipment is to enhance vehicle safety and protect tires from damage through inadvertant use at inadequate pressure levels.

SUMMARY OF THE PRIOR ART

Mechanical air-pressure regulators comprise a diaphragm means driven by a screw-spring mechanism. Although they have proven some worth in protecting tires and making vehicles safer, their intrinsic mechanical nature causes them to be insensitive to small pressure variations, rendering them unprecise for keeping the initial pressure the same. They are also unable to restore the exact set (or initial) pressure to a leaked tire or take some time to do so.

Other apparatuses come with automatic electro-mechanical regulators of the type designed originally for refrigerators, air conditioners and the like, not really adequate constructively for tires pressure regulators. The variety and relative complexity of the parts that make them up make them difficult to assemble and prone to continuous maintenance because of early wear of some parts, particularly the air distribution rotor damaging electrical connections and tube joints. In fact, they have not seemed to attain the purpose for which they were developed, that is, in extending tire-life.

U.S. Pat. No. 4,782,879 to Le Chatelier et al discloses a hydraulic or pneumatic valve arrangement comprising a two-part housing having two independant valve systems combined on a single diaphragm mount. The first valve system is a two-way valve alternatively connecting the associated tires to an air supply system for inflating it and, via the second valve system, to an exhaust hole for deflating the tires. The air supply system is in fact a dual purpose system since it functions both as a tires pressurizing system and a gateable low/high-pressure valve control system. In its latter function, it controls the valves by either supplying subatmospheric pressure to open the tires to the exhaust hole or high pressure to open the first valve and inflate the tire. The patented device further includes a microcomputer control unit.

The device is costly and difficult to manufacture, requiring highly skilled control technicians on the assembly line. In addition, it is both cumbersome and expensive to use on vehicles; for instance, in the case of a two-axle tractor drawing a three-axle trailer, the system would need eighteen pressure controllers, twenty three-way solenoid valves, a pressure regulator, a central control unit, eighteen manometers or the like plus corresponding interfaces for transmitting electrical signals to the control unit.

Moreover, the size and weight of the device make it difficult to mount to the wheel and contribute significantly to wheel imbalance.

As to tire pressure detection, U.S. Pat. No. 4,599,902 to Gray discloses an apparatus comprising a moveable or deformable pressure-responsive control element for engagement to a tire inlet/outlet. This control element, preferably in the form of a Bourdon-tube pressure-gauge, has a vane attached to it which switches in and out of a LED/photodiode coupler which drives an output transistor to connect a pulse generator to suitable alarm or control means responsive to a low-pressure indicative signal to pump the tire up.

This device is by its very nature sensitive to mechanical vibrations and jerks, rendering it unsuitable for vehicles subjected to severe travelling conditions, such as encountered when transporting heavy loads on rough and earth roads or in bad weather conditions.

A need is therefore felt for robust yet simple means for detecting and distributing air and for a apparatus promoting a simple yet reliable design.

SUMMARY OF THE INVENTION

It is an object of the present invention to provide a apparatus for controlling and maintaining the air pressure in land vehicle tires.

It is also an object to overcome the prior art drawbacks and obtain a apparatus which is simpler, robust, more reliable, less costly, and particularly adequate for reliable operation under heavy conditions.

It is another object of the invention to provide a apparatus very sensitive to pressure and small pressure variations, wherein tire leakages may be compensated with hardly any time lag.

Yet another object of the invention is a apparatus which may be installed quickly and efficiently and for proper operation.

It is a further object of the invention a apparatus as forementioned wherein the control unit is small and compact enough to be placed in the vehicle cab near the driver.

Another object of the invention is to reduce the quantity of tubes and cables required in prior art devices for installation of the apparatus, particularly for lorries with multiple axles and trailers.

Yet another object of the invention is to protect the high pressure supply (compressor) from depressurizing under big tire leaks, so that it can also be reliably used for the pneumatic brake system of the vehicle.

Still another object of the invention is to provide a apparatus as forementioned wherein pressures may be selected from a large range.

Another object of the invention is a pressure sensor suitable for the apparatus of the invention.

It is also an object of the invention to provide a robust and reliable, yet simple to manufacture and service, pressure sensor.

BRIEF DESCRIPTION OF THE DRAWINGS

FIGS. 1A and 1B illustrate the dashboard-mounted control unit of the invention and is divided into FIGS. 1A and 1B showing the front and back panels respectively of the unit.

FIG. 5 shows how the neumatic circuit FIG. 3 is adapted for connecting double-wheel-pair axles, as in the case of a vehicle-hauled trailer.

DETAILED DESCRIPTION OF AN EMBODIMENT OF THE INVENTION

Figure 2:
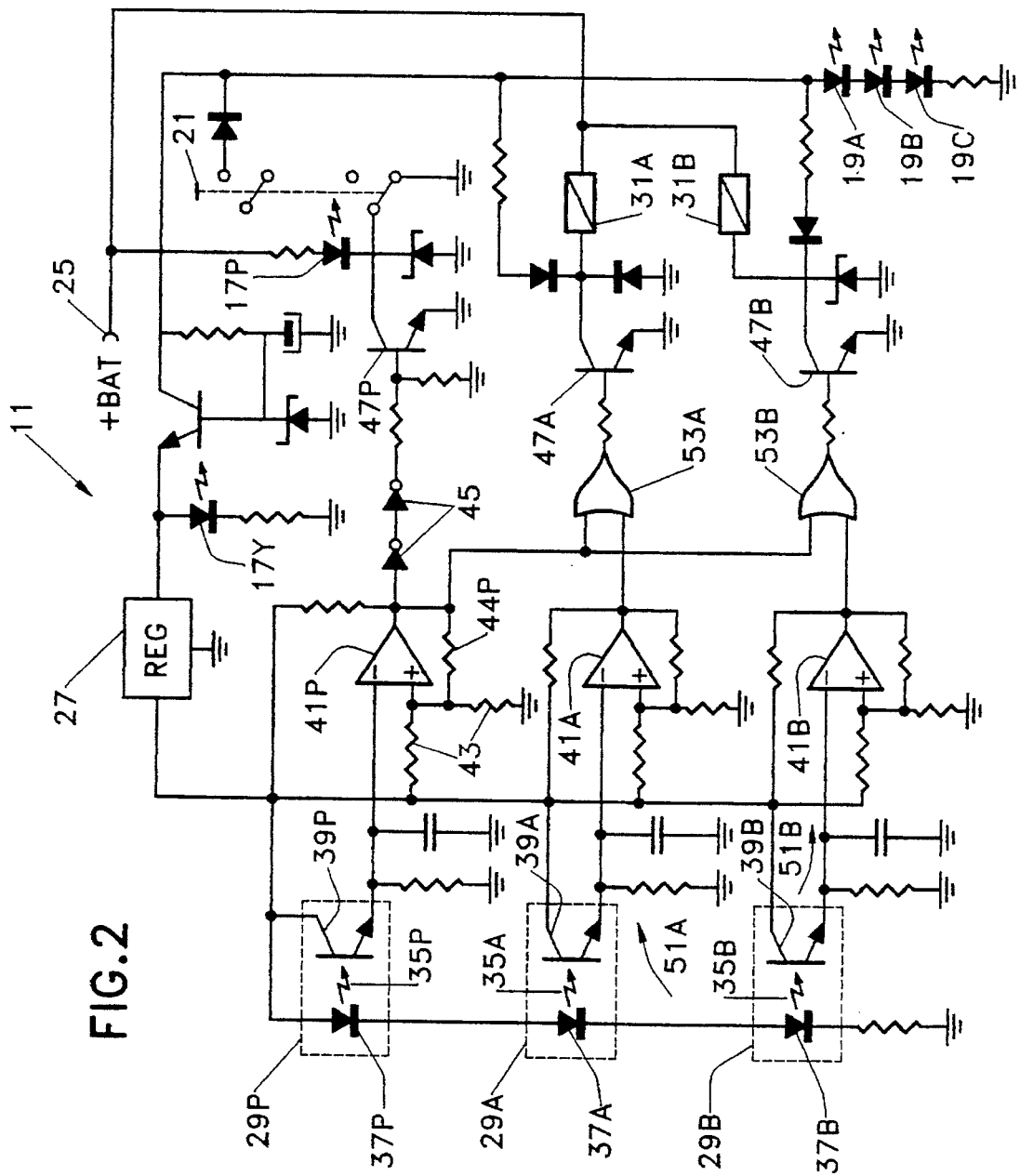
FIG. 2 is a schematic of the electronic circuit of the invention, contained in the unit of FIGS. 1A and 1B.

Refering to FIGS. 1A and 1B, the apparatus of the invention comprises an electronic control unit 11 (FIG. 2) housed in a closed box 13 including a front panel 15 mounted to a vehicle's dashboard (not shown) in front of the driver. The front panel portrays sundry pressure gauges 17 and LED indicators 19, and a push-button 21.

The push-button switch 21 enables the driver to activate or deactivate the apparatus. In the deactivated state, tire pressure is not monitored, one of the LEDs 19P lighting up to warn the driver of this unprotected mode. LED 19P is preferably red and also lights up if the compressor outlet pressure is lower than nominal.

The control box 13 also has a rear (i.e. facing away from the driver towards the vehicle's hood) panel 23 holding a plurality of air-tube terminals 24 which are connected to the pneumatic circuit of the apparatus.

The control unit 11 comprises an electronic circuit shown schematically in FIG. 2. Power is supplied by the vehicle's battery (not shown) via a battery terminal 25 and the push-button switch to a voltage regulator 27. The red LED 17P is in parallel with the switch and thus permanently connected to the battery terminal 25. In the deactivated mode, the switch 21 connects the red LED 17P to ground voltage so that it lights up.

Figure 3:
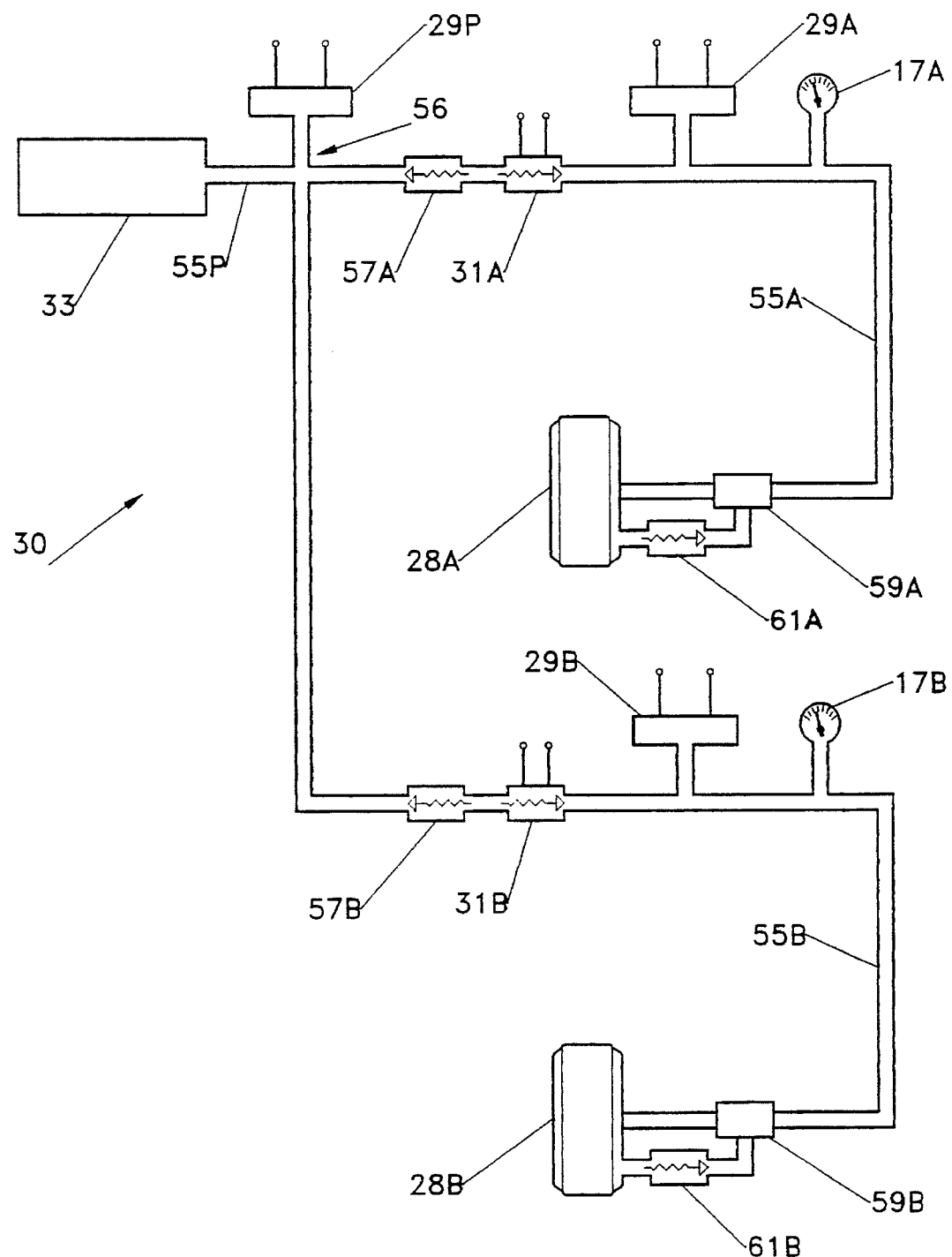
FIG. 3 is a schematic of the pneumatic circuit of the invention coupled to the unit of FIGS. 1A and 1B for interfacing with the circuit of FIG. 2.

Pressing the button 21 activates the apparatus, whereby LED 17P is turned off and electric current from terminal 25 is supplied to a voltage regulator circuit 27, to a green LED 17Y on the panel 15 and to LEDs 17A, 17B ... lighting up a plurality of pressure gauges 19, one for each tire 28 (FIG. 3). The electronic circuit 11 of FIG. 2 interfaces with the pneumatic circuit 30 of FIG. 3 by means of pressure sensors 29 and electrovalves 31.

FIG. 3 shows the pneumatic circuit 30 which is airpressurized by the compressor 33 to maintain and sustain, when required, the tires 28 of a vehicle properly pumped up. Only two such tires 28A, 28B are shown for the sake of simplicity to illustrate the basic circuit and the add-ons for each tire 28. The compressor outlet is connected by tubing 55P to the compressor pressure sensor 29P and a hub 56 for distribution, via tubing 55A and 55B, to the tires 28A, 28B. Each tire circuit 55A, 55B includes a check valve 57, the electrovalve 31, the pressure sensor 29 and the pressure gauge 17, before joining a rotor or rotary coupling 59. (Suffixes A, B, etc. are omitted from the reference numerals when generalizing.) The wheel includes a second checkvalve 61 connecting the tire 28 to the rotary coupling 59. Both check valves 57, 61 protect the tire system from leaking should any part of the tubing 55 be damaged or the compressor be disconnected (e.g. for servicing).

Operation is as follows. The pressure sensors 29 are calibrated to a threshold value corresponding to normal tire pressure, say 95 psi. The compressor outlet pressure is normally much higher of course. In the event tire 28A, for instance, should leak air and lose a certain amount of pressure, say down to about 90 psi, its corresponding sensor 29A generates an electrical signal for the tire monitor circuit 51A (FIG. 2) to open electrovalve 31A, in order to let pressurized air through from the compressor 33 to the tire 28A. Once the tire has recovered the right pressure (95 psi), the pressure sensor 29A signals the monitor circuit to close the valve 31A back again. The driver may monitor all tire pressures visually by means of the gauges 19 in the dashboard panel 15.

Figure 4:
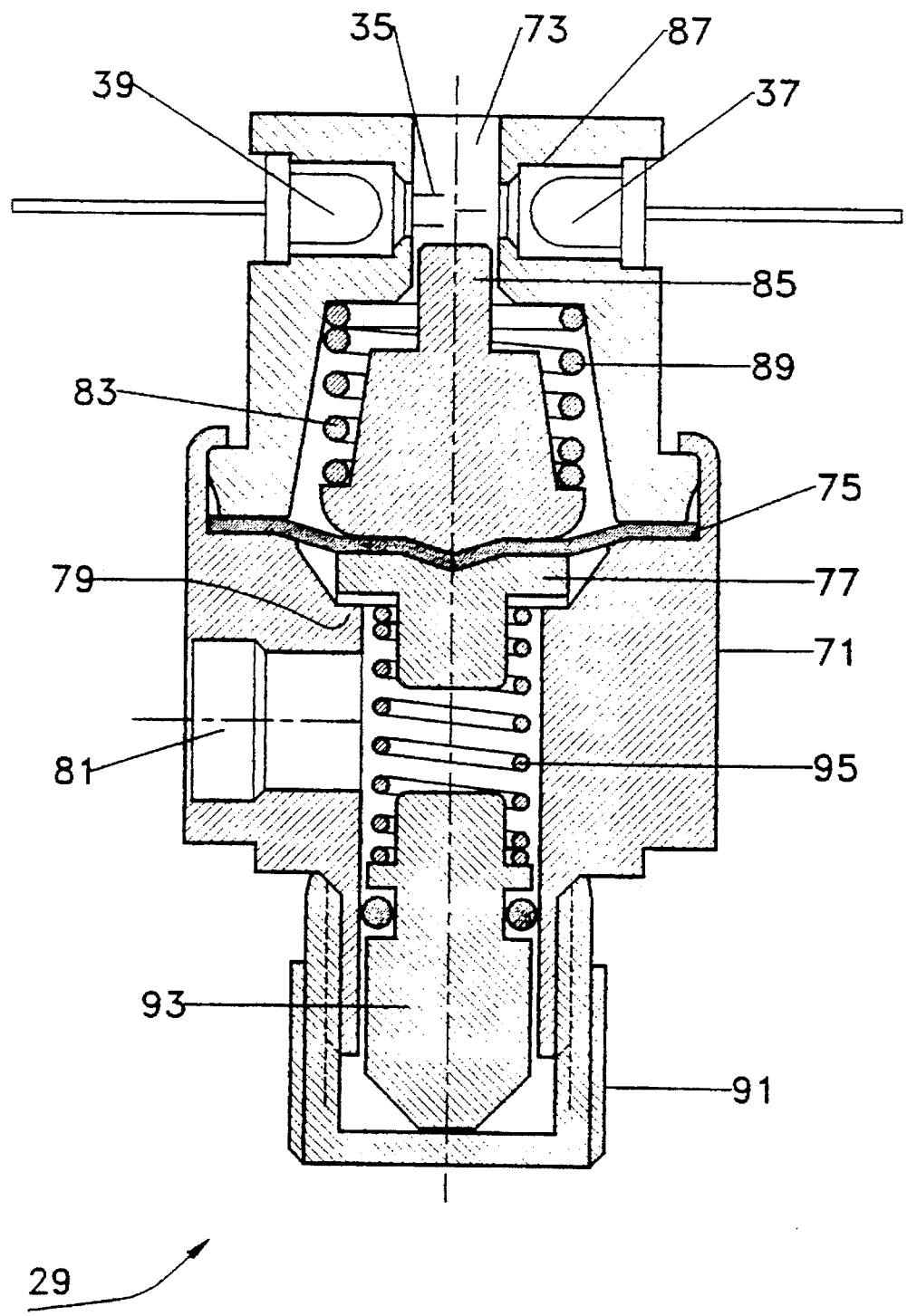
FIG. 4 is a longitudinal cross-section of a pressure sensor according to the invention, suitable for interfacing the circuits of FIGS. 2 and 3.

FIG. 4 depicts, in longitudinal section, a pressure sensor 29 suitable for use in the present invention. It comprises a generally cylindrical housing 71 having a longitudinal bore 73. The bore 73 contains a diaphragm 75 and a piston element 77 generally resting on a seat 79. An orifice 81 on one side of the housing connects the bore to the tubing 55 (FIG. 3). On the side of the diaphragm 75 opposite the piston 77 there is a plunger 83 supporting a shutter 85 projecting from its end opposite the diaphragm 75. At this end of the housing there is a cross-bore 87 for mounting a LED 37 and a phototransistor 39 on opposite sides of the central bore 73, so as to define a light passage 35 therebetween. A spring 89 urges the shutter supporting plunger 83 away from the light passage 35, such that light from the LED 37 may impinge on the phototransistor 39.

If there is sufficient pressure at the side orifice 81 from the associated tire 28, the piston pushes the plunger 83 so that the shutter 85 crosses into the cross-bore 87 blocking the light passage 35. This enables the phototransistor 39 to signal normal air pressure in the tire 28.

The other end of the housing 71 is threaded externally to accomodate an adjustable cap 91. The cap 91 is in contact with a static stem 93 connected to the piston 77 by a spring 95 and may be adjusted by hand, a screwdriver or the like to calibrate the set pressure point.

One such pressure sensor 29P responds to inlet pressure supplied by the compressor 33. Refering back again to FIG. 2, inlet pressure being normal, that is, over a predetermined threshold, a light passage 35P between a LED 37P and an associated phototransistor 39P is blocked. A pull-up resistor thereby forces the negative (or inverting) input (−) of an operational amplifier (op-amp) 41P up and over the voltage at the positive (or non-inverting) input (+) which is set by a voltage-divider resistor network 43. The output of the opamp 41 is connected by a feedback resistor 44P to enhance hysteresis in the switching response of the op-amp 41P. The low level normally present at the output of the op-amp 41P is twice inverted by a pair of cascaded logic inverter gates 45 and shuts off a driver transistor 47P. The op-amp 41P and its associated circuitry condition the signal derived from the pressure sensor, in particular to sharpen driver transistor 47P switching and introduce hysteresis to avoid oscillations when pressure is near threshold levels or from mechanical vibrations, which could be encountered if the vehicle travels over rough terrain.

This driver transistor 47P connects the cathode of warning LED 17P to ground, in parallel with the push-button switch 21. If the compressor 33 pressure is too low, the light passage 35P will become unblocked, resulting in that the driver transistor 47P turns on and, consequently, so does the LED 17P.

The electronic circuit in FIG. 2 comprises a plurality of tire monitor circuits 51. Again, only two such tire monitor circuits 51A and 51B are shown for simplicity. For example, the circuits 51A, 51B may correpond to the tires 28A, 28B (FIG. 3) of a two-wheel axle of the vehicle.

If tire pressures are at the right level, the corresponding pressure sensors 29A, 29B will block the light passages 35A, 35B formed between respective pairs of LED 37A, 39A and phototransistor 39A, 39B assemblies. The phototransistors 39A, 39B are in commonemitter configuration, so that the associated op-amps 41A, 41B will normally supply high levels to respective logic NOR gates 53A, 53B. The resulting logic low levels at the ouput of these NOR gates 53 will thus keep driver transistors 47A, 47B in the off state. These driver transistors 47A, 47B form solid state switches in series with the solenoids of a pair of electrovalves 31A, 31B. The electrovalves 31 control high pressure air supply from the compressor 33 to the respective tires 28 through the pneumatic circuit disclosed hereinbefore in connection with FIG. 3.

If pressure at one (or more) of the tires 28, say tire 28A, drops down low, light from the LED 37A will impinge on the phototransistor 39A in the corresponding pressure sensor 29A, driving it to saturation. The op-amp 41A will receive a high voltage at its negative input (−) so that its output will go low, the NOR gate output go high, and driver transistor 47A saturate to energize the solenoid of the corresponding electrovalve 31A. As a result, the valve 31A will open to let pressurized air enter the tire 28A until the tire has been inflated to a predetermined pressure (plus a bit more to allow for hysteresis). The feedback resistors may be dimensiones so that the response function has hysteresis in the 90–100 psi range.

The NOR gates 53 have a second input each jointly connected to the output from the op-amp 41P in the compressor monitor circuit, to ensure that the tire electrovalves 31 are kept closed in the event that the compressor 33 should become under pressurized. This will protect the tire 28 from becoming even more unpumped in such a circumstance and will also ensure that compressor pressure is not permanently lost in the event of a big tire leak, such as a blow-out. This is important to preserve vehicle braking ability.

In the case of double-wheel mounts on lorry rear axles or trailer axles, wherein a second wheel 28' is mounted alongside the first wheel 28 on the same side of each axle, as shown in FIG. 5, the rotary coupling 59 is provided with an additional orifice for connecting a tube 55' therefrom to the tire air inlet. An additional second check-valve 61' is provided in that tubing 55'. The second check-valves 61, 61' prevent all tires 28, 28' on one axle from going flat when one of them has a puncture. Alternatively, double rotary air couplings could be used although they are not preferred because they are complicated to manufacture.

The pressure sensors 29 and electrovalves 31 are all conveniently housed inside the cabin box 13. This minimizes electrical wiring and avoids having electrical leads other than the power supply leading out of the rear panel 23. All tubing 55, including from a trailer hooked on to the back of the lorry, is connected straight from the rotors 59 to the tube terminals 24 on the rear panel 23. This has several advantages, such as simplifying maintenance and shielding devices 29 and 31 from bangs and dirt and reducing the chances of an electrical wire being severed or having to be layed out in protective shieths. Thus the tube terminals 24 comprise an inlet terminal 24P from the compressor 33 plus terminals 24A, 24B, . . . for the tubing 55 to the tires 28.

Although a preferred embodiment has been brought out in relation to the drawings, the invention is by no means limited thereto but rather extends to all embodiments within the purview of the appended claims.

I claim:

1. Apparatus in a vehicle having a plurality of axles and a compressor, said compressor for outputting air at a nominal pressure, at least a pair of wheels mounted on each axle, a tire mounted to each wheel and normally pumped up with air to at least a set pressure less than said compressor nominal pressure, said apparatus controlling and maintaining air pressure in said tires and comprising:

a plurality of pneumatic tire circuits, each of said tires associated with a respective one of said pneumatic circuits, each pneumatic circuit including tubing means for monitoring and carrying air to said associated tire;

means for distributing pressurized air from said compressor to each of said tubing means;

each of said pneumatic circuits further comprising:
electrovalve means in the associated tubing means;
rotary coupling means mounted to the associated axle for coupling said pressurized air between said tubing and said tire;
pressure sensor means connected to a point on the associated tubing intermediate said electrovalve means and said tire, said pressure sensor means each including light emitting means and associated phototransistor means positioned whereby light from said emitting means may impinge on said phototransistor means to generate an electrical signal indicative of whether air pressure in said tire is higher or lower than said set pressure; and electronic circuit means including operational amplifier means having an input connected to the associated phototransistor means and an output for generating an active signal in response to said tire air-pressure being less than said set pressure, whereby said electronic circuit means is responsive to said air-pressure indicative signal to cause said electrovalve to open when and while said tire air-pressure is substantially lower than said set pressure.

2. The apparatus of claim 1, wherein said electronic circuit means further includes:

driver transistor means connected to said output from the operational amplifier means and to said associated electrovalve means for energizing and opening said electrovalve means in response to said active signal, and feedback means associated to said operational amplifier means for introducing hysteresis in the operational amplifier response.

3. The apparatus of claim 2 and further including means for sensing pressure at the compressor outlet and logic gate means connected in each of said electronic circuit means, said gate means responsive to said compressor outlet pressure sensing means for blocking said active signal from passing from the operational amplifier output to the associated driver transistor to maintain said electrovalves closed when the sensed compressor pressure is less than the nominal compressor pressure.

4. The apparatus of claim 2 and further including manual switch means for turning off power to said electronic circuits, thereby rendering the apparatus inoperative and keeping said electrovalves closed.

5. The apparatus of claim 1, wherein at least one of said axles has two or more pairs of wheels mounted thereto, wherein two or more tires associated with said respective wheels are connected to said rotary coupling, a check-valve connecting each said tire to the rotary coupling.

6. The apparatus of claim 1, wherein said vehicle includes a dashboard and said apparatus further including means for housing said pressurized air distributing means, all said pressure sensor means and said electronic circuit means;

said housing means comprising a box having a front panel and a rear panel, said front panel adapted for mounting to said dashboard, said rear panel having first tube terminal means for connecting said compressor outlet to said distributing means and a plurality of second tube terminal means for connecting said distributing means to each of said tubing means, said electronic circuits each further including luminous indicator means mounted on said front panel to light up in response to said electrical signal when said tire air-pressure is lower than said set pressure, and said pressure sensor means each further including gauge means mounted on said front panel in visual correspondence with the associated light indicating means.

* * * * *